March 11, 1952

E. ORAN 2,588,935

TELEPHONE CALL COUNTING DEVICE

Filed Aug. 6, 1949

INVENTOR.
EDWARD ORAN
BY Zoltan H. Polachek
ATTORNEY

Patented Mar. 11, 1952

2,588,935

UNITED STATES PATENT OFFICE 2,588,935

TELEPHONE CALL COUNTING DEVICE

Edward Oran, Astoria, N. Y.

Application August 6, 1949, Serial No. 108,889

3 Claims. (Cl. 235—117)

This invention relates to new and useful improvements in a telephone call counting device.

More specifically, the present invention proposes the construction of a novel telephone counting device arranged to be placed adjacent a telephone in a manner to clearly indicate the duration of a billing period and the number of telephone calls completed at any time during the billing period.

Still further, the invention proposes characterizing the counting device by a casing having a front wall with an upper horizontal shaft rotatively mounted within the casing and having a month indicator drum mounted thereon with an opening formed in the front wall of the casing through which a portion of the periphery of the month indicator drum can be seen with a retainer mounted on the outer face of the front wall below the opening in a manner to support a numbered card to be considered in conjunction with the visible portion of the month indicator drum to indicate the starting and ending day of a particular billing period.

Another object of the present invention proposes arranging a pair of shafts within the casing and upon the foremost of which three drums (units, tens and hundreds) are individually rotatively mounted in a manner so that the numbers on their peripheries can be successively viewed through suitable openings formed in the front wall of the casing as the drums are rotated.

Still another object of the present invention proposes the provision of means on the rearmost of the pair of shafts for turning the tens drum in timed synchronization with the units drum in a manner so that the tens drum will be advanced one numeral each time the units drum makes a complete revolution.

The invention further proposes the provision of a means on the rearmost of the pair of shafts for turning the hundreds drum in timed synchronization with the tens drum in a manner so that the hundreds drum will be advanced one numeral each time the tens drum makes one complete revolution.

A further object of the present invention proposes forming each of the three drums along one of their sides with enlarged flanges which are extended through the front wall of the casing to be used for manually turning the drums back to zero.

It is a further object of the present invention to provide the casing with a manually operable means to be depressed once upon the completion of each telephone call for advancing the units drum one numeral to record the completed call.

It is also an object of the present invention to slidably mount the units and hundreds drums on the foremost shaft in a manner to be slid slightly laterally away from the center tens drum in a manner so that each of the drums can be individually released to be turned back to zero at the end of one billing period and the start of the next.

Another object of the present invention proposes the construction of a telephone call counting device which is effective for its intended purpose, which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
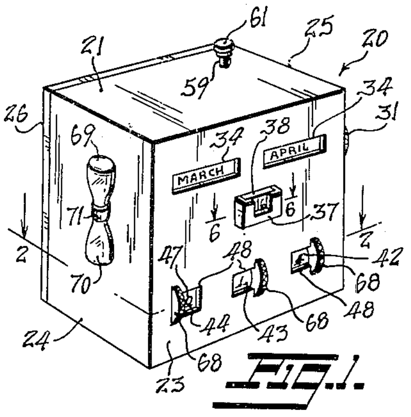
Fig. 1 is a perspective view of the telephone call counting device constructed in accordance with the present invention.
Figure 2:
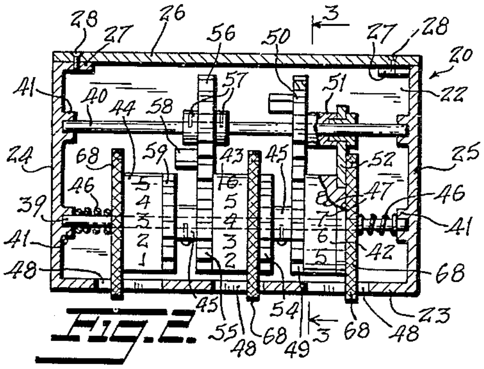
Fig. 2 is an enlarged horizontal sectional view taken on the line 2—2 of Fig. 1.

The telephone call counting device, according to the present invention, includes a casing 20 having a top wall 21, a bottom wall 22, a front wall 23, side walls 24 and 25 and a removable back wall 26. The casing 20 including the back wall is preferably formed of sheet metal but may, if desired, be formed of any one of the known resinous plastic materials commonly used for such purposes and the casing may be decorated or embellished in any desired fashion without departing from the scope and intent of the present invention.

The rear of the casing 20, except for the back wall 25, is open and formed in its corners with four small lugs 27. The corners of the back wall 25 are formed with holes and the lugs 27 are formed with aligned complementary threaded openings. Small screws 28 are passed through the holes in the back wall and are threaded into the openings of the lugs 27 for removably retaining the back wall 25 in position.

Rotatively supported in the top portion of the casing 20 there is an upper horizontal shaft 29. One end of the shaft 29 is rotatively supported in a boss 30 formed on the inner face of the side wall 24. The other end of the shaft 29 is rotatively extended through the side wall 25 and has fixedly mounted on the outer end thereof a knob 31 by which the shaft 29 can be rotated. A collar 32 is fixed to the shaft 29 within the casing 20 and engages the inner face of the side wall 25 to retain the shaft 29 against axial movement.

Figure 10:
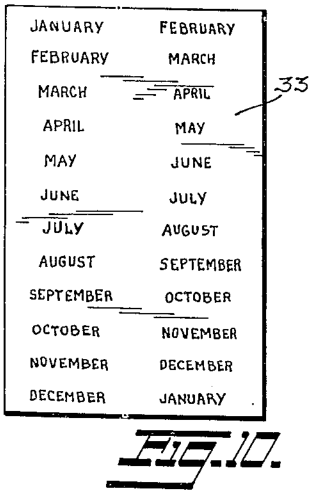
Fig. 10 is a developed view of the month indicating drum per se.
Figure 8:
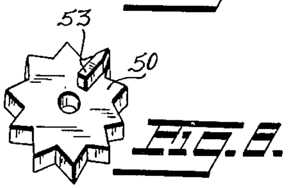
Fig. 8 is an enlarged perspective view of one of the drum driving gears per se.
Figure 6:
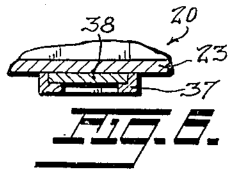
Fig. 6 is an enlarged partial horizontal sectional view taken on the line 6—6 of Fig. 1.

Fixedly mounted on the shaft 29 there is a month indicator drum 33 having the names of the month imprinted on the periphery thereof in aligned successive pairs as shown in Fig. 10. The front wall 23 of the casing 20 is formed with a pair of end aligned horizontal openings 34, see especially Fig. 1, through which one pair of aligned month names can be viewed. One end of the month indicator drum 33 has milled therein a series of twelve equally spaced teeth 35. A spring detent 36 has one end secured to the inner face of the front wall 23 and its other end engaged between adjacent teeth 35 for holding the drum 33 in selected rotated positions in which one pair of the aligned month names will be visible through the openings 34. The detent 36 is shaped to permit free rotation of the month name drum 33 in one direction or the other. Rotation of the month indicator drum 33 is accomplished through rotation of the shaft 29 by means of the knob 31.

Secured to the front face of the front wall 23 of the casing 20, there is a channel-shaped receptor 37 into which small cards 38 are to be selectively positioned. It is proposed to include with the device of the present invention, a group of the cards 38 numbered chronologically from 1 to 31. The user of the device then selects the proper number card 38 and slips it into position in the receptor 37, as clearly shown in Fig. 1, so that the number on the front of the card can be clearly read from the front of the device. The number of the selected card then indicates the day of the month on which the telephone billing period starts. For instance, from the showing in Fig. 1 of the drawing, the billing period extends from the 16th day of March until the 16th day of April.

Included in the casing there is means for keeping track of the total number of telephone calls completed during any one telephone billing period. This means is comprised of a pair of shafts 39 and 40 extended parallel to each other and rotatively supported within the casing 20 below the shaft 29. The shafts 39 and 40 have their ends rotatively supported in bosses 41 on the inside faces of the side walls 24 and 25 of the casing 20. Positioned side by side on the foremost shaft 39 there is a units drum 42, a tens drum 43 and a hundreds drum 44. The tens drum 43 is rotatively but non-slidably retained in position on the foremost shaft 39 by means of a pair of collars 45. The units drum 42 and the hundreds drum 44 are rotatively and axially slidably positioned on the foremost shaft 39 for a purpose which will become clear as this specification proceeds. Coaxially mounted on the ends of the foremost shaft 39 there are coil springs 46 which operate between the adjacent faces of the bosses 41 and the units drum 42 and the hundreds drum 44, urging the drums 42 and 44 inward toward the tens drum 43 and more particularly against the collars 45 mounted on the shaft 39 on opposite sides of the tens drum 43.

Figure 9:
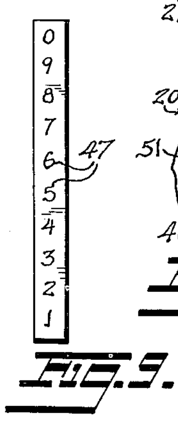
Fig. 9 is a developed view of the numeral carrying portion only of one of the three drums.
Figure 5:
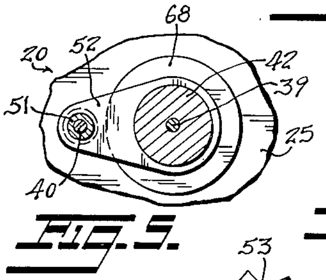
Fig. 5 is an enlarged partial vertical sectional view taken on the line 5—5 of Fig. 4.
Figure 7:
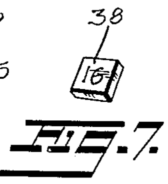
Fig. 7 is a perspective view of one of the date indicating cards per se.

The peripheries of the drums 42, 43 and 44 are provided with the numbers 47, see Fig. 9, in chronological order from 1 to 9 and zero and those numbers are arranged on the drums to be viewed through window openings 48 formed in the front wall 23 of the casing 20.

One side of the units drum 42 has milled in the periphery thereof ten teeth 49 and rotatively supported on the rearmost shaft 40 behind the units drum 42 there is a drive gear 50 having its teeth meshing with the teeth 49 or the units drum 42. The drive gear 50 is formed with a laterally extending hub 51 and a connector 52 has one end rotatively connected to the hub 51 and its other end rotatively connected to the units drum 42. The hub 51 and the units drum 42 are each formed of separate parts fixedly connected together which permit the connector 52 to be rotatively engaged therewith. The connector 52 serves to connect the drive gear 50 to the units drum 42 so that when the drum is shifted longitudinally on the shaft 39, the gear 50 will be moved longitudinally on the shaft 40 retaining the gear in constant mesh with the gear teeth 49 of the units drum.

The side of the drive gear 50 opposite the hub 51 and adjacent the tens drum 43 is formed with a laterally projecting cog 53. The side of the tens drum 43 adjacent the units drum 42, is formed with ten teeth 54. Each time the drive gear 50 completes one revolution, the cog 53 will engage between the adjacent teeth 54 of the tens drum 43 and turn the tens drum through one tenth of a revolution to advance it one digit. The relationship between the units drum 42 and the tens drum 43 is such that the tens drum will advance one digit each time the units drum is advanced from nine to zero.

The side of the tens drum 43, opposite the side thereof formed with the teeth 54, is formed with ten teeth 55. Rotatively but non-slidably mounted on the rearmost shaft 40 behind the tens drum 43, there is a second drive gear 56 which has ten teeth meshing with the teeth 55 of the tens drum 43. The gear 56 is retained against sliding movements on the shaft 40 by means of collars 57 secured to the shaft 40 on opposite sides of the gear leaving it free for rotation relative to the shaft.

The side of the drive gear 56 adjacent the hundreds drum 44 is formed with a cog 58. The side of the hundreds drum 44 is formed with ten teeth 59 arranged to be acted upon by the cog 58. The synchronization between the tens drum 43 and the drive gear 56 is such that the cog 58 will engage the teeth 59 of the hundreds drum 44 and advance that drum one digit each time the tens drum 43 is advanced from nine to zero.

The casing 20 is provided with means, operable from the outside of the casing, which is operative to advance the units drum 42 one digit each time one telephone call is completed. The units drum advancing means comprises a rod 59 slidably extended through the top wall 21 of the casing 20 and through a bracket 60 mounted on the inner face of the top wall 21. The top end of the rod 59, above the casing 20, is provided with a knob 61 by which the rod 59 can be conveniently depressed. The rod 59 is of any desired cross-sectional shape so as not to rotate relative to the bracket 60 and the casing 20 and is retained in a raised position by a coil spring 62. The spring 62 is coaxially mounted on the rod 59 and operates between the top face of the bracket 60 and a collar 63 mounted on the rod 59 so as to abut the inner face of the top wall 21.

Pivotally mounted on the bottom end of the rod 59, within the casing 20, there is a foot 64. The foot is pivotally attached to the bottom end of the rod 59 by means of a pin 65 and abuts the bottom end of the rod 59 so as to limit pivotal movement of the foot 64 with relation to the rod 59 to a rearward direction only or in a counter-clockwise direction as viewed in Fig. 3. The foot 64 is retained in an axially aligned position with relation to the rod 59 by means of a leaf spring 66 secured to the inner face of the back wall 25 of the casing and which bears against the rear face of the foot 64.

Figure 3:
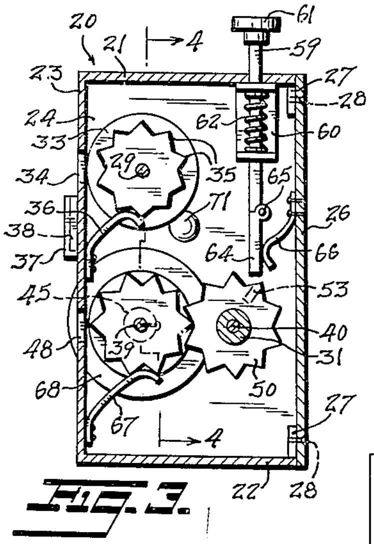
Fig. 3 is a vertical sectional view taken on the line 3—3 of Fig. 2.
Figure 4:
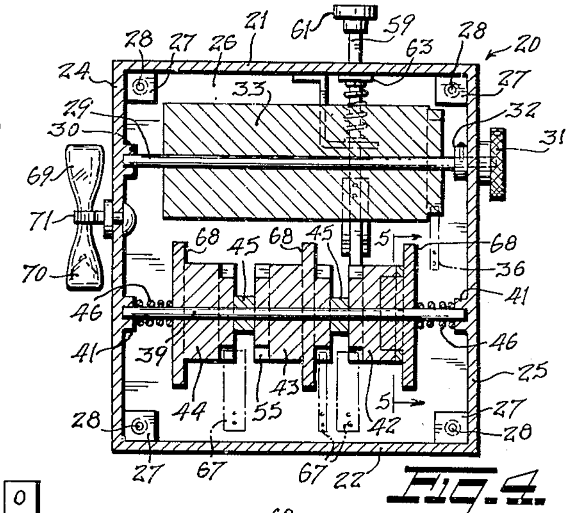
Fig. 4 is a vertical sectional view taken on the line 4—4 of Fig. 3.

The rod 59 and its operative foot 64 are positioned vertically within the casing 20 directly over one of the rearmost teeth of the drive gear 50 which drives the units drum 42. To advance the units drum 42 one digit, upon completion of a telephone call, it is merely necessary to completely depress the rod 59 until the knob 61 strikes the top wall 21 of the casing 20. During such downward movement the bottom end of the foot 64, will engage the tooth of the drive gear 50 located immediately therebeneath and advance the gear one tooth and similarly advance the units drum 42 and expose the next numeral thereof in the respective window opening 48. The pivotal mounting of the foot 64 permits it to pivot with relation to the bottom end of the rod 59 to follow the arcuate path taken by the tooth of the drive gear 50 upon which the foot 64 is operating. The rod 59 upon being released will be urged upward by the spring 62 and the bottom end of the foot 64 will snap back to its end aligned position with the rod 59 over the top of the next tooth of the drive gear 50, as shown in Fig. 3. The foot 64 is returned to its end aligned position with relation to the rod 59 by means of the leaf spring 66.

Upon the tenth depression of the rod 59, the cog 53 of the drive gear 50 will engage the teeth of the tens drum 43 and advance the tens drum to the next digit. Upon each one hundredth depression of the rod 59, the units drum 42 will be advanced from nine to zero and the cog 53 will operate to also advance the tens drum 43 from nine to zero. As the tens drum 43 advances from nine to zero, the cog 58 of the drive gear 56 will function to advance the hundreds drum 44 to the next digit.

The drums 42, 43 and 44 are retained in rotative positions in which their numerals 47 will be properly aligned with the respective window openings 48 by means of flexible leaf springs 67. The leaf springs 67 are secured at their bottom ends to the inner face of the front wall 23 of the casing and having their top ends formed with an untensioned bias to engage between adjacent teeth of the drums, as shown in Fig. 3. When the numerals of the drums 42, 43 and 44 are properly aligned with the respective window openings 48 of the front wall 23, then the springs 67 are under no load or tension.

At the end of each billing period, the total number of calls completed in that period can be quickly noted by viewing the numbers exposed in the window opening 48, as shown in Fig. 1. At the start of the new billing period, the drums 42, 43 and 44 must each be set back to zero manually. To accomplish the resetting of the drums back to zero, each of the drums 42, 43 and 44 is formed with an enlarged flange portion 68 which is extended through the front wall 23 of the casing 20. More particularly, the flange portions 68 are extended through enlargements of the respective window openings 48, to be used to turn the drums 42, 43 and 44 back to zero against the holding action of the respective leaf springs 67.

In turning the drums 42, 43 and 44 back to zero, the hundreds drum 44 is first turned back to zero by rotating it by means of the flange portion 68 until the numeral zero of that drum 44 appears in the respective window opening 48. Next the tens drum 43 is turned back to zero through the medium of its respective flange portion 68. However, before rotation of the tens drum 43 is started, the hundreds drum 44 is slid axially on the shaft 39 against the action of its respective coil spring 46 and by means of its respective flange portion 68. With the hundreds drum 44 in the axially shifted position the tens drum 43 is turned back to zero and due to the interengagement of the drive gear 56 with the teeth 55, the gear 56 will turn with the tens drum 43 to retain the proper synchronization of the numerals 47 of the tens drum 43 with the cog 58 of the drive gear 56. When the tens drum reaches its zero position, the hundreds drum 44 is released to be returned to its starting position by the respective spring 46.

Finally, the units drum 42 is turned back to zero. This accomplished by first moving the units drum 42 laterally away from the tens drum 43 against the action of the spring 46. Due to the connection of the drive gear 50 with the units drum 42, through the medium of the connector 52, the drive gear 50 will also be moved laterally on the rearmost shaft 49. Movement of the drive gear 50 moves that gear away from the bottom end of the foot 64 and moves the cog 53 away from the teeth 54 of the tens drum 43 leaving the units drum 42 and the gear 50 free to rotate, while being held in the laterally shifted position, to align the numeral zero of the units drum 42 with the respective window opening 48. When that position is reached, the flange portion 68 of the units drum 42 is released and the respective coil spring 46 will return the drum 42 and the drive gear 50 to their starting positions in which the drum 42 bears against the adjacent collar 45. When the drums 42 and 44 are shifted laterally on the shaft 39, the teeth of those drums engaged by the leaf springs 67 will move away from the leaf springs; however, the leaf springs will retain their normal positions due to their untensioned bias when engaged between the teeth of the drums to reengage the teeth of the drums when the drums are released and urged back to their starting positions by the respective coil springs 46.

Mounted upon the side wall 24 of the casing 20, there is a small transparent container 69 divided into spaced bulbous portions by a reduced neck portion having a small passage connecting the interiors of the bulbous portions. The interior of the container 69 has a quantity of sand 70 which will require three minutes to pass from one bulbous portion of the container 69 to the other through the reduced neck portion. The container 69 is mounted on a bracket 71 which is rotatively mounted on the side wall 24 of the casing 20. By turning the container 69 with relation to the side wall 24 to position the bulbous portion thereof having the sand 70 at the top so that the sand will pass through the passage of the reduced neck portion, the container 70 can be used to time one telephone call so as to limit it to three minutes or any multiple of three minutes by repeatedly turning the container 69 through one hundred and eighty degrees.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a call counting device having a casing enclosing a pair of adjacent shafts, a numbered drum slidably and rotatively positioned on one of the shafts, said drum having circumferential gear teeth at one of its ends, a gear slidably and rotatively positioned on the other of said shafts and meshing with said gear teeth to advance said drum one number each time said gear is turned a part of a revolution, a manually depressible plunger supported by the casing in a position over one of the teeth of said gear for turning said gear a part of a revolution each time said plunger is depressed, a stop collar mounted on the said one shaft at one side of said drum, means interconnecting said drum and said gear to slide as a unit on their respective shafts while leaving them free for rotation in opposite directions, resilient means urging said drum against said stop collar to maintain said gear in position beneath said plunger to be rotated thereby when depressed and means for shifting said drum away from said collar against the action of said resilient means to in turn move said gear from beneath said plunger to free said drum and said gear to be turned manually in one direction or the other independently of said plunger.

2. In a call counting device having a casing enclosing a pair of adjacent shafts, a numbered drum slidably and rotatively positioned on one of the shafts, said drum having circumferential gear teeth at one of its ends, a gear slidably and rotatively positioned on the other of said shafts and meshing with said gear teeth to advance said drum one number each time said gear is turned a part of a revolution, a manually depressible plunger supported by the casing in a position over one of the teeth of said gear for turning said gear a part of a revolution each time said plunger is depressed, a stop collar mounted on the said one shaft at one side of said drum, means interconnecting said drum and said gear to slide as a unit on their respective shafts while leaving them free for rotation in opposite directions, resilient means urging said drum against said stop collar to maintain said gear in position beneath said plunger to be rotated thereby when depressed and means for shifting said drum away from said collar against the action of said resilient means to in turn move said gear from beneath said plunger to free said drum and said gear to be turned manually in one direction or the other independently of said plunger, said interconnecting means comprising, a hub extended laterally from one side of said gear and encircling the said other shaft and a connector having one end rotatively encircling said drum and its other end rotatively encircling said hub.

3. In a call counting device having a casing enclosing a pair of adjacent shafts, a numbered drum slidably and rotatively positioned on one of the shafts, said drum having circumferential gear teeth at one of its ends, a gear slidably and rotatively positioned on the other of said shafts and meshing with said gear teeth to advance said drum one number each time said gear is turned a part of a revolution, a manually depressible plunger supported by the casing in a position over one of the teeth of said gear for turning said gear a part of a revolution each time said plunger is depressed, a stop collar mounted on the said one shaft at one side of said drum, means interconnecting said drum and said gear to slide as a unit on their respective shafts while leaving them free for rotation in opposite directions, resilient means urging said drum against said stop collar to maintain said gear in position beneath said plunger to be rotated thereby when depressed and means for shifting said drum away from said collar against the action of said resilient means to in turn move said gear from beneath said plunger to free said drum and said gear to be turned manually in one direction or the other independently of said plunger, said shifting means comprising an enlarged knurled flange portion, the casing having a window opening through which said flange portion is extended to be gripped for sliding said drum on said one shaft and for turning the same.

EDWARD ORAN.

REFERENCES CITED

The following references are of record in the file of this patent:

UNITED STATES PATENTS

| Number | Name | Date |
|---|---|---|
| 187,972 | Gram | Mar. 6, 1877 |
| 541,373 | Michaud | June 18, 1895 |
| 543,816 | Stitzer | July 30, 1895 |
| 578,906 | Wood | Mar. 16, 1897 |
| 1,348,575 | Odhner | Aug. 3, 1920 |
| 1,418,384 | Marbel | June 6, 1922 |
| 1,657,828 | Henderson | Jan. 31, 1928 |
| 1,705,018 | Jones | Mar. 12, 1929 |
| 1,711,222 | Bronner | Apr. 30, 1929 |
| 1,826,520 | McGowan | Oct. 6, 1931 |
| 1,956,152 | Kempf | Apr. 24, 1934 |
| 2,110,668 | Janssen | Mar. 8, 1938 |